(12) United States Patent
Walger

(10) Patent No.: US 6,560,129 B1
(45) Date of Patent: May 6, 2003

(54) POWER SUPPLY UNIT AND PROCESS FOR GENERATING PROTECTIVE CURRENTS TO PROTECT METAL LINES AGAINST CORROSION

(75) Inventor: Martin Walger, Witten (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/959,070

(22) PCT Filed: Mar. 29, 2000

(86) PCT No.: PCT/EP00/02734

§ 371 (c)(1),
(2), (4) Date: Dec. 14, 2001

(87) PCT Pub. No.: WO00/65821

PCT Pub. Date: Nov. 2, 2000

(30) Foreign Application Priority Data

Apr. 24, 1999 (DE) .......................... 199 18 753

(51) Int. Cl.$^7$ .......................... H02H 7/10; H04M 11/00
(52) U.S. Cl. .......................... 363/50; 379/412
(58) Field of Search ...................... 363/50; 379/399.01, 379/412, 413

(56) References Cited

U.S. PATENT DOCUMENTS

| 5,131,033 | A |   | 7/1992 | Reum ........................... 379/413 |
| 5,216,704 | A |   | 6/1993 | Williams et al. ............... 379/93 |
| 5,442,697 | A | * | 8/1995 | McGary et al. ......... 379/399.02 |
| 5,642,412 | A | * | 6/1997 | Reymond ..................... 379/348 |
| 6,351,533 | B1 | * | 2/2002 | Parrott ........................ 379/412 |

OTHER PUBLICATIONS

Frantz et al. "Sealing Current And Its Impact On ISDN Powering Requirements", Proceedings of the Int'l Telecommunications Energy Conference, U.S., New York, IEEE, vol. Conf. 10, Oct. 30, 1988, pp. 151–156 (XP000042298).

* cited by examiner

Primary Examiner—Adolf Deneke Berhane
(74) Attorney, Agent, or Firm—Cohen, Pontani, Lieberman & Pavane

(57) ABSTRACT

The invention relates to a power supply unit (SCC) for generating a protective current (sealing current), which is superposed on signal currents carried by metal lines for protection against corrosion at tie points or splices of the metal lines, wherein the power supply unit is particularly suited for delivering ANSI T1.601-1992 conformant protective currents (sealing currents) for digital user terminal lines. It exhibits two voltage-controlled power sources ($J_1$, $J_2$), wherein the first power source ($J_1$) is capable, depending on an applied voltage ($U_{C1}$), of outputting a constant current ($I_1$) having a first value of 0 mA, or a constant current ($I_1$) having a second value of at least 1 mA, in particular 1.2 mA, and wherein the second power source ($J_2$) is capable, under a threshold value, in particular of 0 V, of the applied voltage ($U_{C2}$), of outputting a constant current ($I_2$) having a third value of 0 mA, and, above the threshold value of the applied voltage ($U_{C2}$) and proportional to the latter, a current ($I_2$) between the constant current ($I_2$) of the third value and a fourth value of 20 mA diminished at least by the constant current ($I_1$) having the second value of the first power source ($J_1$), as well as at least one voltage input ($E_2$), which is connected with the control input of the second power source ($J_2$) via an integrator (RCI), and a current output (A), with which both the output of the first and the output of the second power source ($J_1$, $J_2$) is connected for outputting the sum of the currents ($I_1$, $I_2$) delivered by both power sources.

58 Claims, 3 Drawing Sheets

Figure 1:
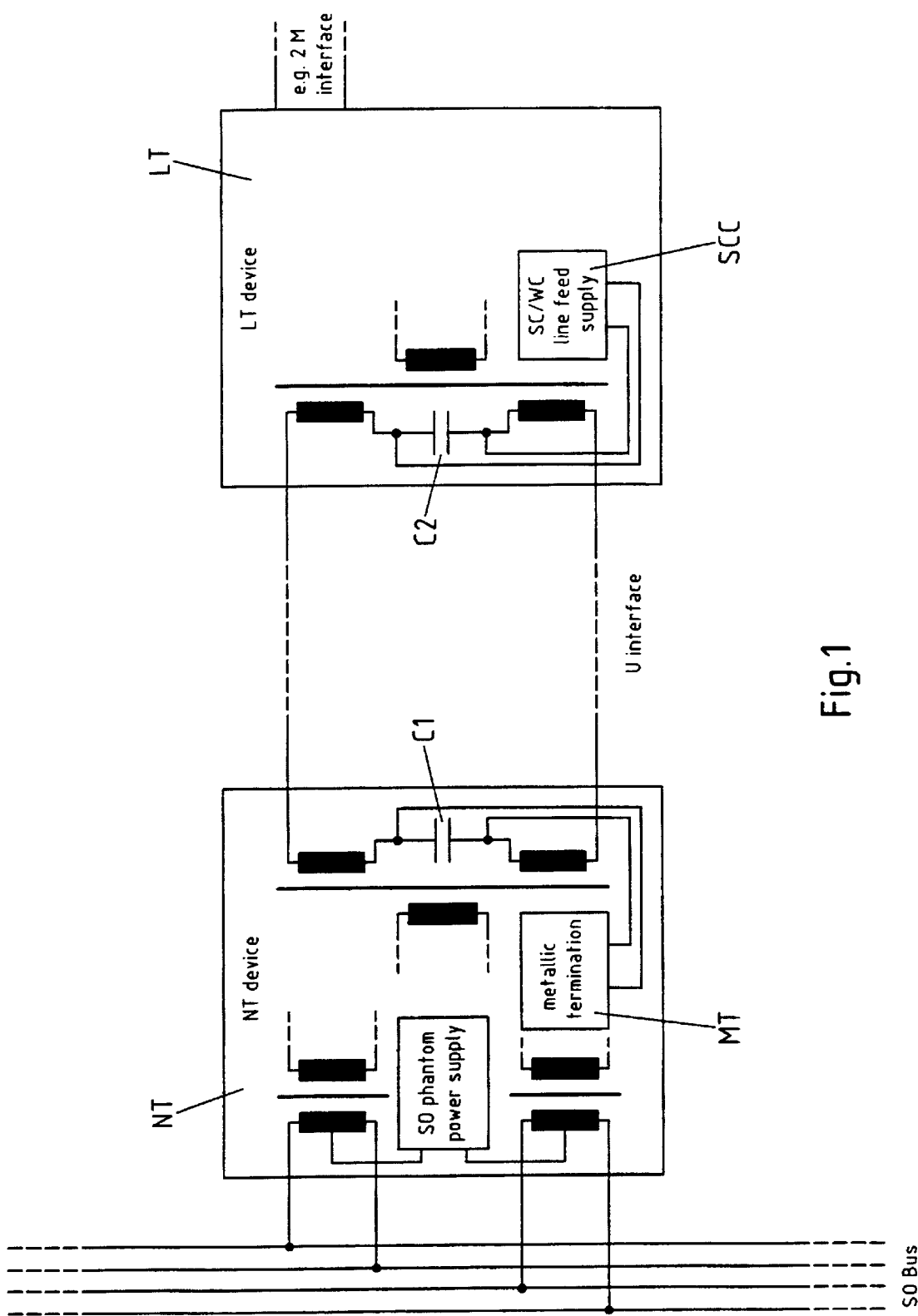

POWER SUPPLY UNIT AND PROCESS FOR GENERATING PROTECTIVE CURRENTS TO PROTECT METAL LINES AGAINST CORROSION

PRIORITY CLAIM

This is a national stage of PCT application No. PCT/EP00/02734, filed on Mar. 29, 2000. Priority is claimed on that application, and on patent application No. 199 18 753.3 filed in Germany on Apr. 24, 1999.

FIELD OF THE INVENTION

The invention relates to a power supply unit for generating a protective current (sealing current), which is superposed on signal currents carried by metal lines for protection against corrosion. The invention also relates to a process for generating such a protective

BACKGROUND OF THE INVENTION

The metal lines used for transmitting signal currents, e.g., the copper lines in telephone networks still commonly in use for ISDN terminals, are exposed to corrosion at splices or tie points, which over time results in a deterioration in conductivity along the employed line.

However, it was found that feeding in a low direct current can prevent corrosion of the lines.

Primarily for this reason, a protective current (sealing/wetting current) of several milliamperes is superposed on the irregular and direct current-free data stream via the copper lines in digital subscriber terminal systems that use metal line loops as in the ISDN base terminal (BA).

In systems where a remote feed is set upon the user to supply power to the network terminating unit (NT), the direct current can perform the same function as the protective current on the line resulting from the power consumption by the network terminating unit. By contrast, an application provide for protective current supply is normally not used to supply power to network terminating units.

Another potential application for protective current is to use it as a line detection signal for network terminating units (NT). In an ISDN network, the network terminating unit on the user side forms the transition between the basic terminal interface (U interface), which establishes the connection to a central office, and the standardized $S_0$ interface, to which users can hook up their terminals.

According to standard ANSI T1.601-1992, which describes the basic terminal interface when using metal line loops in ISDN applications, it is not absolutely necessary to provide a protective current. However, if a protective current is provided, certain requirements have to be met. If it does not measure 0 mA, the protective current must exhibit values ranging between 1 mA and 20 mA. In addition, the maximal allowable change rate for the protective current is 20 mA/s.

Other requirements are placed on the metal terminating unit (metallic termination) of a network terminal device, which provides a non-linear direct current path as the sink for the protective current fed in via the terminal lines. The operating states of the metal terminating unit are the nonconducting state OFF (high impedance) and conductive state ON (low impedance).

If a voltage to range between 30 V and 39 V is applied for a preset time to range between 3 ms and 50 ms in the OFF state of the metal terminating unit, a switch is made to the ON state. In this case, the state is to switch within at most 50 ms starting from the point the preset voltage was exceeded. A state change does not take place even at voltages exceeding the preset voltage if it is exceeded for less than 3 ms.

If the current drops below a preset current value (0.1–1.0 mA) for a preset time (3–100 ms) in the ON state of the metal terminating unit, a switch is to be made to the OFF state. In this case, the state is to change within at most 100 ms starting from the point at which levels dropped below the preset current. A state change does not take place even at currents less than the preset current is it levels remain below the preset current for less than 3 ms.

The process of feeding a protective current into the data transmission lines must not disrupt ongoing transmissions. For this reason, it is essential that a stable ON state be ensured for the metal terminating unit of a network terminal unit, and that current changes not arise too abruptly.

Therefore, the power supply unit in, the line terminal unit must satisfy several special requirements to reliably ensure a stable operation of the metal terminating unit of the network terminal unit on the user side.

SUMMARY OF THE INVENTION

The object of the invention is to provide a power supply unit that is particularly suited for delivering ANSI T1.601-1992-conformant protective currents (sealing currents) for digital user terminal lines.

The object is solved according to the invention on the one hand by a power supply unit for generating a protective current (sealing current), which is superposed on the metal lines via signal currents transmitted via metal lines for protection against corrosion at tie points or splices; this power supply unit exhibits two voltage-controlled power sources, wherein the first power source is capable, depending on an applied voltage, of outputting a constant current having a first value of 0 mA, or a constant current having a second value of at least 1 mA, in particular 1.2 mA, and wherein the second power source is capable, under a threshold value, in particular of 0 V, of the applied voltage, of outputting a constant current having a third value of 0 mA, and, above the threshold value of the applied voltage and proportional to the latter, a current between the constant current of the third value and a fourth value of 20 mA diminished at least by the constant current having the second value of the first power source, exhibits at least one voltage input, which is connected with the control input of the second power source via an integrator, and exhibits a current output, with which both the output of the first and the output of the second power source are connected for outputting the sum of the currents delivered by both power sources.

In addition, the object is achieved according to the invention by a process for generating a protective current (sealing current) for protection against corrosion of splices and/or tie points of metal lines via a power supply unit, which comprises a first and second voltage-controlled power source, wherein the first power source is capable, depending on an applied binary control voltage, to generate a constant current having a first value of 0 mA, or a constant current having a second value of at least 1 mA, in particular 1.2 mA, and wherein the second power source is capable, at below a threshold value, in particular of 0 V, to generate a constant current having a third value of 0 mA, and at above the threshold value of the applied voltage and proportional to the latter, a current between the constant current having the third value and a fourth value 20 mA diminished at least by the constant current having the second value of the first power source, characterized by the following steps:

application of an input voltage to the voltage input of the power supply unit, generation of a binary input voltage from the applied input voltage, unless binary application of the latter has already taken place, integration of the binary input voltage, in particular via RC integration, shifting of integrated voltage by a negative offset voltage, generation of binary control voltage by comparing the input voltage, integrated input voltage or integrated and shifted input voltage with a reference value using a comparator, generation of an initial output current via the first power source, controlled by the binary control voltage, generation of a second output current via the second power source, controlled by the integrated and shifted voltage, addition of the first and second output current into a total current to be used as a protective current, and output of the protective current on the metal lines to be protected against corrosion.

The binary control voltage should assume a high level during acceleration, before the shifted voltage exceeds the threshold value, and assume a low level during deceleration, before the shifted voltage again drops below the threshold value.

With the power supply unit and process according to the invention, it is possible to provide a protective current that satisfies the ANSI T1.601-1992 requirements.

The power supply unit according to the invention can be operated in such a way as to generate and output a protective current that measures either 0 mA, or runs between a value$\geq$1 mA, e.g., 1.2 mA, and a value$\leq$20 mA.

The protective current generated and output using the process according to the invention starts at a value$\geq$1 mA, e.g., 1.2 mA, when applying a voltage with a high level to the voltage input of the power supply unit, rises to $\leq$20 mA and drops, and then drops back down to a value$\geq$1 mA after applying a voltage with a low level to the voltage input of the power supply unit. An abrupt transition from 0 mA to the value$\geq$1 mA can be achieved at the outset, followed at the end by a direct transition from the value$\geq$1 mA to 0 mA. This kind of current progression can also be achieved with the power supply unit according to the invention. The maximal change rate of the current generated by the second power source, and hence also of the protective current, can be set in such a way by appropriately dimensioning the integrator and at the offset voltage level that a change rate of 20 mA/s is never exceeded with the power supply unit active.

In addition, the power supply unit and process according to the invention can be used to satisfy the ANSI T1.601-1992 requirements relating to the metal terminating unit of a network terminal unit.

Immediately after the metal terminating unit of the network terminal unit has gone from is OFF to its ON state, the power supply unit can deliver a direct current that exceeds the release current set at a value of between 0.1 mA and 1.0 mA (ANSI T1.601-1992), below which the metal terminating unit can again switch to the OFF state. Once the metal terminating unit has been turned on, the rate of rise for the protective current, which rises to a maximum of 20 mA, is limited to a maximum of 20 mA/s given appropriately set parameters. Due to the exponential rise of the current achieved via the provided integration, the maximum of 20 mA can also be reached and maintained without any irregular transitions.

In addition, the rate of decline for the protective current as it drops from its maximal value of 20 mA to a value slightly exceeding the set minimal value of the protective current of 1 mA, below which the metal terminating unit again switches to the OFF state, can be limited to a maximal 20 mA/s. Due to the exponential drop in current, the minimal value of the protective current can also be reached and maintained without any irregular transitions.

The transition of the metal terminating unit from its ON state to its OFF state is reached starting front the final value of the protective current$\geq$1 mA by virtue of the fact that the supplied protective current drops off in a strictly monotonic manner.

If the metal terminating unit in the OFF state is to be activated, the no-load voltage of the power supply unit is set in such a way that it exceeds the set upper limit for the activation voltage of the metal terminating unit of 39 V.

By contrast, after switching from the ON to the OFF state of the metal terminating unit, once the shortest possible release time of 3 ms has elapsed, the no-load voltage of the power supply unit, which now delivers no more current, is held under the lowest activation voltage of 30 V, to prevent an immediate reactivation of the metal terminating unit. By deactivating the power sources, this can be automatically ensured.

In a preferred embodiment of the power supply unit according to the invention, a level shifter is arranged between the integrator and control input of the second power source, wherein the level shifter is capable of shifting the voltage by a negative offset voltage. An analog arrangement of other components can also be provided instead of a level shifter. If the voltage output by the integrator is applied to the input of the comparator, the magnitude of the offset voltage of the level shifter preferably exceeds the reference voltage of the comparator, so that the first power source is activated already a short time before the second power source.

One particularly flexible potential application for the power supply unit and process according to the invention is achieved with a first power source that can be activated on the one hand by the binary voltage delivered by the comparator, and on the other hand by a voltage that can be separately applied and made available in binary form.

This provides the operator with three different types of operation:

In a first type of operation, the voltage can be permanently set to a low level at the input connected with the integrator, and the voltage at the other voltage input can be permanently set to a high level, as a result of which a constant, low direct current greater than 1 mA, in particular 1.2 mA, is output.

This type of operation is primarily of importance for low-power applications, in which a high protective current cannot be used, but it must still be possible to stably operate the metal terminating unit of an ANSI T1.601-1992 conformant network terminal unit in the ON state, while the low protective current is applied to the line.

In a second type of operation, the voltage at the first voltage input can be continuously set to a high level, and the voltage a the additional voltage input can be continuously set to a low level. In this case, the standard output current of the power supply unit is 20 mA. The power supply unit is deactivated only for maintenance operations, by also setting the voltage at the first voltage input to a low level. This is followed by an exponential drop to the value $\geq 1$ mA, and after a short time, a step-by-step transition to 0 mA. Once the power supply unit is reactivated by again continuously setting the voltage at the first voltage input to a high level, a jump first takes place to a value $\geq 1$ mA, e.g., 1.2 mA, followed a short time later by an exponential rise to 20 mA.

Finally, a third type of operation can involve a mixed operation, in which the power supply unit basically outputs a low current with a value $\geq 1$ mA, by permanently applying a high level to the first power source via the additional voltage input. A voltage with a low level is again applied to the integrator under normal conditions. This time, however, this voltage applied to the integrator is set to a high level at regular intervals and for a specific duration. This results in an exponential rise to $\leq 20$ mA after a short delay, depending on the value of the offset voltage of the level shifter. After the voltage applied to the integrator has again assumed a low level, the output current drops exponentially to the value $\geq 1$ mA. Such a mixed operation is preferred worldwide by several network operators. The protective current rise is usually repeated in intervals of about 15 minutes for a duration of about 20 seconds.

In an advantageous embodiment of the power supply unit according to the invention, a binary voltage is already applied to the voltage input and/or to the additional voltage input of the power supply unit. As an alternative, however, the applied voltages can also be converted into binary voltages only inside the power supply unit, e.g., via a Schmitt trigger. The binary voltages applied to the inputs or generated internally can be amplified and/or shifted via additional level shifters downstream from the voltage inputs. Particularly suited high and low levels of the binary voltage signals for continued processing, e.g., integration and OR operation, can be set through such a transformation to another binary voltage level, independently of the input voltages.

Corresponding control software is advantageously used to control the voltages to be applied to the inputs of the power supply unit, e.g., integrated in the microprocessor of the user terminal card. Software control is particularly easy to implement. However, it can also take place in any other manner desired, e.g., via hard-wired logic.

Other objects and features of the present invention will become apparent from the following detailed description considered in conjunction with the accompanying drawings. It is to be understood. however, that the drawings are intended solely for purposes of illustration and not as a definition of the limits of the invention, for which reference should be made to the appended claims.

Figure 2:
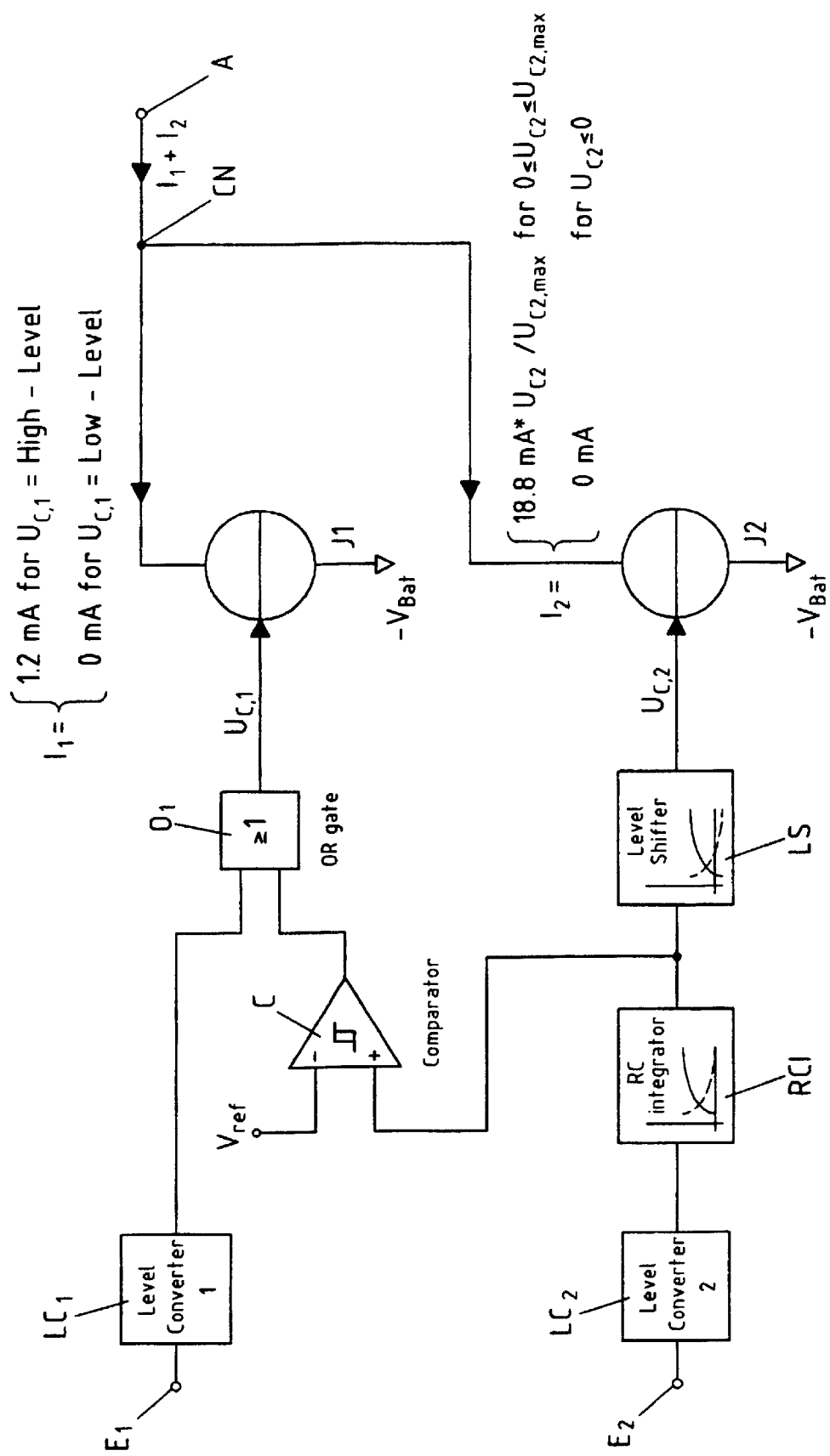
Figure 3:
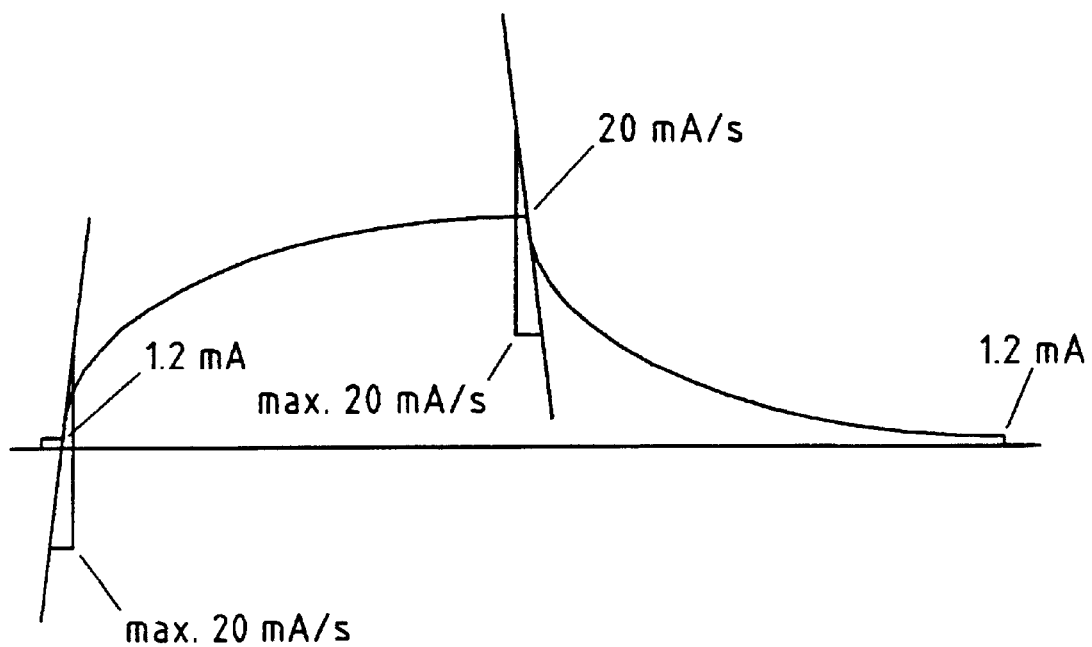
Figure 4:
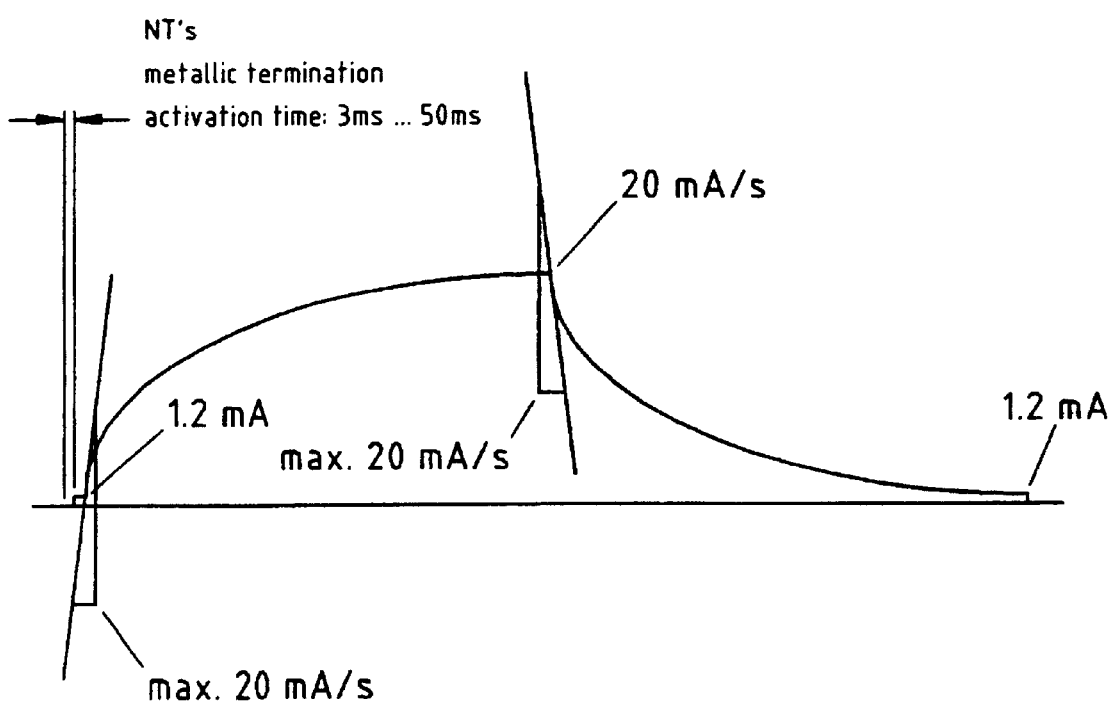

In the following, the power supply unit and process according to the invention will be described in greater detail based on an embodiment making reference to drawings. Here, FIG. 1 shows an interface of a digital user terminal at the U reference point of an ISDN system, which feeds a protective current into the terminal line, FIG. 2 shows a block diagram of an embodiment of a power supply unit according to the invention, FIG. 3 shows the basic progression of a protective current output by a power supply unit according to the invention, which is routed to an ohmic load, and FIG. 4 shows the basic progression of a protective current output by a power supply unit according to the invention, which is routed to an NT device.

DETAILED DESCRIPTION OF THE PRESENTLY PREFERRED EMBODIMENTS

FIG. 1 provides an overview of an ISDN basic terminal, in which a power supply unit SC according to the invention is integrated to generate a protective current, which is fed into metal connecting cables for protection against corrosion.

An $S_0$ bus interface is connected with a line terminating unit LT of a central office of a telecommunications network via a network terminating unit NT (network termination) and a U interface. At the $S_0$ interface, the user can hook up any terminal units, such as voice, text and data terminals, via receptacle outlets. The network terminating unit NT, which forms the terminal of the ISDN network, supplies the user and signaling data of the terminal units at the $S_0$ bus to the transmission medium, and ensures its transport. The U Interface is formed by the copper twin wires of the connecting cable to the central office.

At both the network terminating unit NT and line terminating unit LT, the connecting cables are connected with two line-side coils of a transformer, between which one coupling capacitor C1, C2 each is arranged. Situated in the network terminating unit NT is a metal terminating unit MT, which is connected via the capacitor C1 between the transformer coils of the network terminating unit NT. Located in line terminating unit LT is a power supply unit SCC according to the invention, whose outputs are connected via the capacitor C2 between the transformer coils of the line terminating unit LT.

The metal terminating unit MT has an ANSI standard conformant design, and the power supply unit SCC is able to provide the protective current required In the ANSI standard for a stable operation of the metal terminating unit MT.

FIG. 2 uses a block diagram to illustrate the structure of a power supply unit according to the invention. This power supply unit provides a current that can be fed into the copper connecting cables to prevent corrosion on the latter.

The power supply unit SCC exhibits two inputs $E_1$, $E_2$ for binary control voltages, terminated by one level converter $LC_1$, LC each.

The output of the first level converter $LC_1$ is connected with the control input of a first voltage-controlled power source $J_1$ via an OR gate $O_1$. This first power source $J_1$ is able to deliver a constant current $I_1$ of about 1.2 mA if a high-level voltage is applied to its control input. By contrast, if a low-level voltage is applied to the control input, the power source is deactivated, i.e., an output current of 0 mA is present.

The output of the second level converter $LC_2$ is connected with the control input of a second voltage-controlled power source $J_2$ via an RC integrator RCI and a level shifter LS. The second power source $J_2$ delivers a current $I_2$ that is directly proportional to the voltage applied to its control input if the latter exceeds a threshold value that is here set to 0V. In this case, scaling takes place with 18.8 mA/ (maximal applied voltage $UC_{2,max}$), so that a maximal current $I_2$ of 18.8 mA is output by the second power source $J_2$.

A tap takes place between the RC integrator RCI and level shifter LS, which is routed to the non-inverting input (+) of a comparator C. The tap for the comparator input can also take place at another location, taking Into account the differently arranged voltage values. The inverting input (−) of the comparator C is connected with a reference voltage source. The output of the comparator C forms the second inout or the OR gate $O_1$, through which the first level converter $LC_1$ is connected with the first power source $J_1$.

The outputs of power sources $J_1$, $J_2$ are jointly routed via a node point CN to the output A of the power supply unit SCC, through which it has access to the lines to be protected.

The mode of operation of the power supply unit SCC will now be described for a first type of operation drawing reference to FIG. 3, which depicts the idealized progression of the total current output to an ohmic load over time for normal operation. The influence of capacities C1 and C2 and the line capacity were left out of account in the depiction. Corresponding deviations arise when taking these elements into account. An ANSI T1.601-1992 conformant protective current of 20 mA was taken as the basis.

The starting point is a situation in which both the first and second power source $J_1$, $J_2$ are deactivated, since a voltage $UC_1$, $UC_2$ of 0 V is applied to the control input of both sources $J_1$, $J_2$.

In this type of operation, no voltage is applied to input $E_1$ of the first level converter $LC_1$, at any time, nor a low-level voltage.

By contrast, a voltage pulse is applied to the input $E_1$ of the second level converter $LC_2$ at preset time intervals, which Is followed by the output of the RC integrator RCI with an exponentially rising voltage that is routed to the non-inverting input of the comparator C on the one hand, and to the input of the level shifter LS on the other.

The comparator C compares the output voltage of the RC integrator RCI with the reference voltage $V_{ref}$ of the reference voltage source applied to the other input of the comparator C. As soon as the exponentially rising voltage output by the RC integrator RCI exceeds the reference voltage $V_{ref}$, the value of the output voltage of the comparator C changes from a low level to a high level. Since this output voltage is connected with the control input of the first power source $J_1$ via the OR gate $O_1$, it thereby activates the first power source $J_1$, so that the latter delivers an output current of $I_1$ =1.2 mA, which initially represents the total current as well. FIG. 3 illustrates this as a current stage of 1.2 mA at the start of the depicted current progression.

The level shifter LS, to which the output voltage of the RC integrator RCI is also routed, delays a positive voltage $UC_2$ applied to the second power source $J_1$ by superposing a negative offset voltage on the output voltage of the RC integrator RCI. The magnitude of the offset voltage is here set to a value exceeding the value of the reference voltage $V_{ref}$ applied to the comparator C. In this way, it can be ensured that the second power source $J_2$ will only be activated a specific time after the current stage of 1.2 mA of the total current generated by the first power source $J_1$. The resulting voltage $UC_2$ output by the level shifter LS is routed directly to the control input of the second voltage-controlled power source $J_2$. As soon as the value of the output voltage of the level shifter LS exceeds the threshold value of 0 V, the second power source $J_2$ is activated, and now generates a current $I_2$ directly proportional to the applied control voltage $UC_2$. At an applied control voltage of $0<UC_2<UC_{2,max}$, the proportionality factor of 18.8 mA * $UC_{2,max}$ yields an output current $I_2$ of between 0 mA and a maximal 18.8 mA.

Since the currents $I_1$, $I_2$ generated by the first power source $J_1$ and second power source are summated in the node point. CN or the total current output by the power supply unit, the total current consists of the current of 1.2 mA output by the first power source superposed with the current output by the second power source $J_2$, which rises exponentially from 0 mA to 18.8 mA.

FIG. 3 shows the total current that arises from this in the exponentially increasing range of the current progression. If both power sources $J_1$, $J_2$ deliver their maximal output current $I_1$, $I_2$, the total current $I_1+I_2=1.2$ mA+18.8 mA measures 20 mA, as required. In addition, the structural components of the RC generator RCI and the offset voltage of the level shifter LS are selected in such a way that a maximal current rise of 20 mA/s arises in the current $I_2$ generated by the second power source $J_2$. Since the current $I_1$ generated by the first power source $J_1$ is constant, the rise in total current after the jump to 1.2 mA is hence limited to a maximal 20 mA/s.

Exactly the opposite progression comes about as the edge of the voltage pulse applied to the input $E_2$ of the second level converter drops: The RC integrator RCI delivers an exponentially diminishing output voltage, which additionally is applied to the comparator C and level shifter LS. The voltage $UC_2$ superposed with the offset voltage by the level shifter LS, which is applied to the second power source $J_2$, triggers the generation of a current $I_2$ proportional to the voltage $UC_2$ until the voltage $UC_1$ drops below the threshold of 0 V and deactivates power source $J_2$. Since the magnitude of the offset voltage is greater than the reference voltage $V_{ref}$ applied to the comparator, a high-level voltage $UC_1$ is still applied to the first power source $J_1$ for a short time after the second power source $J_2$ has already been deactivated. However, as soon as the output voltage of the RC integrator RCI also drops below the reference voltage $V_{ref}$, the voltage $UC_1$ assumes a low level as well, and the first power source $J_1$ deactivates too. As a result, the power supply unit no longer delivers any protective current, even as a total current.

In FIG. 3, the progression of the total current during this segment corresponds to the exponentially diminishing area of the current progression, which again changes step by step from 1.2 mA back to 0 mA at the end. Here as well, the maximal rate of current change measures 20 mA/s.

FIG. 4 illustrates the progression of a protective current fed into an ANSI T1.601-1992 conformant metal terminating unit MT of a network terminating unit NT, once again in idealized form. The difference from the progression in FIG. 3 is a delay in the onset of a protective current flow at the start of the activation phase, which stems from the activation time of the metal terminating unit MT, and measures 3 ms–50 ms per the ANSI T1.601-1992 standard.

In an actual implementation of the power supply unit SCC on a user line card, the progression of the protective current recorded over time can easily deviate from the idealized protective current progression depicted in FIG. 4. In particular, a significant surge current can arise at the start of the current flow as the metal terminating unit switches from its OFF to its ON state. This is primarily caused by the coupling capacitor C2, which is arranged between the two coils on the line side of the transformer of the line terminal LT. The effect of other capacitors in use along with the capacity of the copper lines that discharge at this moment might also come into play. However, this does not significantly impair the performance of the protective current system. Rather, it even facilitates the reliable transition from the OFF to ON slate of the metal terminating unit.

As an alternative to the type of operation just described, the operator can select a type of operation in which a constant, low protective current of 1.2 mA is applied to the lines to be protected by continuously injecting a high-level voltage $UC_1$ via the level converter $L_1$ and applying a low level to the input of the second level converter $LC_2$. In conformance with the high-level applied voltage UC1 at its control input, the power source J1 outputs a fixed current of 1.2 mA, while the second power source J2 remains deactivated, since the input is kept low, i.e., below the threshold value of 0 V.

Finally, the power supply unit SCC according to the invention shown on FIG. 2 makes it possible to select a mixed type of operation by continuously injecting a high-level voltage $UC_1$ via the level converter $LC_1$ on the one hand, and applying a high-level voltage to the input of the second level converter $LC_2$, for example every 15 minutes for a short time interval of, for example, about 20 s, but otherwise applying a low-level voltage.

As a result, a permanent protective current of 1.2 mA generated by the first power source $J_1$ is in turn applied to the line. In this case, however, a short-term increase in the output current takes place per the progression shown on FIG. 3 at certain intervals in which the second power source $J_2$ is additionally activated, resulting form a superposition of the currents output by the first and second power source $J_1$, $J_2$, wherein the total current rises up to 20 mA.

This mixed type of operation can be realized by using timer software designed for this purpose, which runs on the microprocessor of the user terminal card and controls the voltages applied to the inputs of the level converters $LC_1$, $LC_2$.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. Power supply unit generating a protective current (sealing current), which is superposed on signal currents carried by metal lines for protection against corrosion at tie points or splices of the metal lines, which exhibits two voltage-controlled power sources ($J_1$, $J_2$), wherein the first power source ($J_1$) is capable, depending on an applied voltage ($U_{C1}$), of outputting a constant current ($I_1$) having a first value of 0 mA, or a constant current ($I_1$) having a second value of at least 1 mA, in particular 1.2 mA, and wherein the second power source ($J_2$) is capable, under a threshold value, in particular of 0 V, of the applied voltage ($U_{C2}$), of outputting a constant current ($I_2$) having a third value of 0 mA, and, above the threshold value of the applied voltage ($U_{C2}$) and proportional to the latter, a current ($I_2$) between the constant current ($I_2$) of the third value and a fourth value of 20 mA diminished at least by the constant current ($I_1$) having the second value of the first power source ($J_1$), exhibits at least one voltage input ($E_2$) which is connected with the control input of the second power source ($J_2$) via an integrator (RCI), and exhibits a current output (A), with which both the output of the first and the output of the second power source ($J_1$, $J_2$) is connected for outputting the sum of the currents ($I_1$, $I_2$) delivered by both power sources.

2. Power supply unit according to claim 1, characterized by the fact that the first power source ($J_1$) can be activated via an additional voltage input ($E_1$), wherein the first power source ($J_1$) generates and outputs the first constant current value with a low-level voltage applied, and the second constant current value with a high-level voltage applied.

3. Power supply unit according to claim 1, characterized by the fact that the first power source ($J_1$) can be activated via a comparator (C), which compares a preset reference voltage ($V_{ref}$) with a voltage tapped between the voltage input ($E_2$) and second power source ($J_2$), in particular the voltage output by the integrator (RIC), wherein the binary output voltage of the comparator (C) exhibits a high level when the voltage tapped between the voltage input ($E_2$) and second power source ($J_2$) exceeds the reference voltage ($V_{ref}$), and otherwise a low level, and wherein the first power source ($J_1$) generates and outputs the first constant current value with low-level voltage applied, and the second constant current value with high-level voltage applied.

4. Power supply unit according to claim 2, characterized by the fact that the additional voltage input ($E_1$) and output of the comparator (C) are each connected with the inputs of an OR gate (01), either directly or via suitable structural components, whose output is adjacent to the controlling input of the first power source ($J_1$), wherein a high-level binary voltage ($UC_1$) is applied to the first power source ($J_1$) if at least one of the voltages applied to the OR gate (01) exhibits a high level, and a low-level binary voltage ($UC_1$) otherwise.

5. Power supply unit according to claim 1, characterized by the fact that a binary voltage can be applied to at least one of the first and an additional voltage input ($E_2$, $E_1$) of the power supply unit (SCC) for controlling the power sources ($J_1$, $J_2$), or that a voltage applied to at least one of the first and additional voltage input ($E_2$, $E_1$) of the power supply unit (SCC) can be converted into a binary voltage inside the power supply unit (SCC).

6. Power supply unit according to claim 1, characterized by the fact that a level converter ($LC_2$, $LC_1$) is set up downstream from at least one of the first and an additional voltage input ($E_2$, $E_1$) of the power supply unit (SCC) to at least one of amplify and shift the binary voltage applied to the respective level converter ($LC_2$, $LC_1$) to a binary voltage more suitable for further processing.

7. Power supply unit according to claim 3, characterized by the fact that a level shifter (LS) is arranged between the integrator (RCI) and control input of the second power source ($J_2$), wherein the level shifter (LS) is capable of shifting the voltage by a negative offset voltage, that the voltage tapped between the voltage input ($E_2$) and second power source ($J_2$) is the voltage output by the integrator (RIC), and that the magnitude of the offset voltage of the level shifter (LS) is greater than the reference voltage ($V_{ref}$) of the comparator (C).

8. Power supply unit according to claim 1, characterized by the fact that the parameters suitable for setting the maximal change rate ($dI_2/dt$) of the current ($I_2$) generated by the second power source ($J_2$) are selected in such a way that the maximal change rate ($dI_2/dt$) measures 20 mA/s.

9. Power supply unit according to claim 1, characterized by the fact that the integrator (RCI) is an RC integrator.

10. Use of a power supply unit (SCC) according to claim 1 for providing protection against corrosion to metal lines which are closed on a side facing away from the power supply unit by at least one of an ohmic and an inductive load, or by a metal terminating unit (MT) of a network terminal unit (NT) of an ISDN network.

11. Use of a power supply unit (SCC) according to claim 1 for generating a current as a line detection signal.

12. Power supply unit according to claim 2, characterized by the fact that the first power source ($J_1$) can be activated via a comparator (C), which compares a preset reference voltage ($V_{ref}$) with a voltage tapped between the voltage input ($E_2$) and second power source ($J_2$), in particular the voltage output by the integrator (RIC), wherein the binary output voltage of the comparator (C) exhibits a high level when the voltage tapped between the voltage input ($E_2$) and second power source ($J_2$) exceeds the reference voltage ($V_{ref}$), and otherwise a low level, and wherein the first power source ($J_1$) generates and outputs the first constant current value with low-level voltage applied, and the second constant current value with high-level voltage applied.

13. Powell supply unit according to claim 3, characterized by the fact that the additional voltage input ($E_1$) and output of the comparator (C) are each connected with the inputs of an OR gate (01), either directly or via suitable structural components, whose output is adjacent to the controlling input of the first power source ($J_1$), wherein a high-level binary voltage ($UC_1$) is applied to the first power source ($J_1$) if at least one of the voltages applied to the OR gate (01) exhibits a high level, and a low-level binary voltage ($UC_1$) otherwise.

14. Power supply unit according to claim 2, characterized by the fact that a binary voltage can be applied to at least one of the first and additional voltage input ($E_2$, $E_1$) of the power supply unit (SCC) for controlling the power sources ($J_2$, $J_2$), or that a voltage applied to at least one of the first and additional voltage input ($E_2$, $E_1$) of the power supply unit (SCC) can be converted into a binary voltage inside the power supply unit (SCC).

15. Power supply unit according to claim 3, characterized by the fact that a binary voltage can be applied to at least one of the first and an additional voltage input ($E_2$, $E_1$) of the power supply unit (SCC) for controlling the power sources ($J_1$, $J_2$), or that a voltage applied to at least one of the first and additional voltage input ($E_2$, $E_1$) of the power supply unit (SCC) can be converted into a binary voltage inside the power supply unit (SCC).

16. Power supply unit according to claim 4, characterized by the fact that a binary voltage can be applied to at least one of the first and additional voltage input ($E_2$, $E_1$) of the power supply unit (SCC) for controlling the power sources ($J_1$, $J_2$), or that a voltage applied to at least one of the first and additional voltage input ($E_2$, $E_1$) of the power supply unit (SCC) can be converted into a binary voltage inside the power supply unit (SCC).

17. Power supply unit according to claim 2, characterized by the fact that a level converter ($LC_2$, $LC_1$) is set up downstream from at least one of the first and additional voltage input ($E_2$, $E_1$) of the power supply unit (SCC) to at least one of amplify and shift the binary voltage applied to the respective level converter ($LC_2$, $LC_1$) to a binary voltage more suitable for further processing.

18. Power supply unit according to claim 3, characterized by the fact that a level converter ($LC_2$, $LC_1$) is set up downstream from at least one of the first and an additional voltage input ($E_2$, $E_1$) of the power supply unit (SCC) to at least one of amplify and shift the binary voltage applied to the respective level converter ($LC_2$, $LC_1$) to a binary voltage more suitable for further processing.

19. Power supply unit according to claim 4, characterized by the fact that a level converter ($LC_2$, $LC_1$) is set up downstream from at least one of the first and additional voltage input ($E_2$, $E_1$) of the power supply unit (SCC) to at least one of amplify and shift the binary voltage applied to the respective level converter ($LC_2$, $LC_1$) to a binary voltage more suitable for further processing.

20. Power supply unit according to claim 5, characterized by the fact that a level converter ($LC_2$, $LC_1$) is set up downstream from at least one of the first and additional voltage input ($E_2$, $E_1$) of the power supply unit (SCC) to at least one of amplify and shift the binary voltage applied to the respective level converter ($LC_2$, $LC_1$) to a binary voltage more suitable for further processing.

21. Power supply unit according to claim 4, characterized by the fact that a level shifter (LS) is arranged between the integrator (RCI) and control input of the second power source ($J_2$), wherein the level shifter (LS) is capable of shifting the voltage by a negative offset voltage, that the voltage tapped between the voltage input ($E_2$) and second power source ($J_2$) is the voltage output by the integrator (RIC), and that the magnitude of the offset voltage of the level shifter (LS) is greater than the reference voltage ($V_{ref}$) of the comparator (C).

22. Power supply unit according to claim 5, characterized by the fact that a level shifter (LS) is arranged between the integrator (RCI) and control input of the second power source ($J_2$), wherein the level shifter (LS) is capable of shifting the voltage by a negative offset voltage, that the voltage tapped between the voltage input ($E_2$) and second power source ($J_2$) is the voltage output by the integrator (RIC), and that the magnitude of the offset voltage of the level shifter (LS) is greater than the reference voltage ($V_{ref}$) of the comparator (C).

23. Power supply unit according to claim 6, characterized by the fact that a level shifter (LS) is arranged between the integrator (RCI) and control input of the second power source ($J_2$), wherein the level shifter (LS) is capable of shifting the voltage by a negative offset voltage, that the voltage tapped between the voltage input ($E_2$) and second power source ($J_2$) is the voltage output by the integrator (RIC), and that the magnitude of the offset voltage of the level shifter (LS) is greater than the reference voltage ($V_{ref}$) of the comparator (C).

24. Power supply unit according to claim 2, characterized by the fact that the parameters suitable for setting the maximal change rate ($dI_2/dt$) of the current ($I_2$) generated by the second power source ($J_2$) are selected in such a way that the maximal change rate ($dI_2/dt$) measures 20 mA/s.

25. Power supply unit according to claim 3, characterized by the fact that the parameters suitable for setting the maximal change rate ($dI_2/dt$) of the current ($I_2$) generated by the second power source ($J_2$) are selected in such a way that the maximal change rate ($dI_2/dt$) measures 20 mA/s.

26. Power supply unit according to claim 4, characterized by the fact that the parameters suitable for setting the maximal change rate ($dI_2/dt$) of the current ($I_2$) generated by the second power source ($J_2$) are selected in such a way that the maximal change rate ($dI_2/dt$) measures 20 mA/s.

27. Power supply unit according to claim 5, characterized by the fact that the parameters suitable for setting the maximal change rate ($dI_2/dt$) of the current ($I_2$) generated by the second power source ($J_2$) are selected in such a way that the maximal change rate ($dI_2/dt$) measures 20 mA/s.

28. Power supply unit according to claim 6, characterized by the fact that the parameters suitable for setting the maximal change rate ($dI_2/dt$) of the current ($I_2$) generated by the second power source ($J_2$) are selected in such a way that the maximal change rate ($dI_2/dt$) measures 20 mA/s.

29. Power supply unit according to claim 7, characterized by the fact that the parameters suitable for setting the maximal change rate ($dI_2/dt$) of the current ($I_2$) generated by the second power source ($J_2$) are selected in such a way that the maximal change rate ($dI_2/dt$) measures 20 mA/s.

30. Power supply unit according to claim 8, wherein the parameters suitable for setting the maximal change rate ($dI_2/dt$) of the current ($I_2$) generated by the second power source ($J_2$) are the dimensions of the structural components of the integrator and an offset voltage of a level shifter (LS).

31. Power supply unit according to claim 2, characterized by the fact that the integrator (RCI) is an RC integrator.

32. Power supply unit according to claim 3, characterized by the fact that the integrator (RCI) is an RC integrator.

33. Power supply unit according to claim 4, characterized by the fact that the integrator (RCI) is an RC integrator.

34. Power supply unit according to claim 5, characterized by the fact that the integrator (RCI) is an RC integrator.

35. Power supply unit according to claim 6, characterized by the fact that the integrator (RCI) is an RC integrator.

36. Power supply unit according to claim 7, characterized by the fact that the integrator (RCI) is an RC integrator.

37. Power supply unit according to claim 8, characterized by the fact that the integrator (RCI) is an RC integrator.

38. Power supply unit according to claim 30, characterized by the fact that the integrator (RCI) is an RC integrator.

39. Process for generating a protective current (sealing current) for protection against corrosion of splices and/or tie points of metal lines via a power supply unit (SCC) that comprises a first and second voltage-controlled power source ($J_1$, $J_2$), wherein the first power source ($J_1$) is capable, depending on an applied binary control voltage ($U_{C1}$), of outputting a constant current ($I_1$) having a first value of 0 mA, or a constant current ($I_2$) having a second value of at least 1 mA, in particular 1.2 mA, and wherein the second power source ($J_2$) is capable, under a threshold value, in particular of 0 V, of outputting a constant current ($I_2$) having a third value of 0 mA, and, above the threshold value of the applied voltage ($U_{C2}$) and proportional to the latter, a current ($I_2$) between the constant current ($I_2$) of the third value and a fourth value of 20 mA diminished at least by the constant current ($I_1$) having the second value of the first power source ($J_1$), characterized by the following steps:

application of an input voltage to the voltage input ($E_2$) of the power supply unit (SCC), generation of a binary input voltage from the applied input voltage, unless binary application of the latter has already taken place, integration of the binary input voltage, in particular via RC integration, shifting of integrated voltage by a negative offset voltage, generation of binary control voltage ($UC_1$) by comparing the input voltage, integrated input voltage or integrated and shifted input voltage with a reference value ($V_{ref}$) using a comparator (C), generation of an initial output current ($I_1$) via the first power source ($J_1$), controlled by the binary control voltage ($UC_1$), generation of a second output current ($I_2$) via the second power source ($J_2$), controlled by the integrated and shifted voltage ($UC_2$), addition of the first and second output current ($I_1$, $I_2$) into a total current to be used as a protective current, and output of the protective current on the metal lines to be protected against corrosion.

40. Process according to claim 10, characterized by the fact that a binary control voltage can additionally be provided via a second voltage input ($E_1$) of the power supply unit (SCC), wherein a high-level control voltage ($UC_1$) is applied to the control input of the first power source ($J_1$) if at least one of the provided control voltages of the second control input ($E_1$) and comparator (C) exhibits a high level.

41. Process according to claim 39, characterized by the fact that the voltage made available at at least one of the input ($E_2$) and a second input ($E_1$) of the power supply unit (SCC) is applied first as a binary voltage to a level converter ($LC_2$, $LC_1$), and at least one of amplified and shifted by the latter to a suitable binary voltage.

42. Process according to claim 39, characterized by the fact that the output protective current is superposed on a digital line signal transmitted on the lines to be protected.

43. Process according to claim 39, characterized by the fact that the output protective current is fed into a digital user terminal.

44. Process according to claim 39, characterized by the fact that control of the voltage or voltages to be applied to the power supply unit is effected using software or via a hard-wired logic.

45. Process according to claim 40, characterized by the fact that the voltage made available at at least one of the input ($E_2$) and the second input ($E_1$) of the power supply unit (SCC) is applied first as a binary voltage to a level converter ($LC_2$, $LC_1$), and at least one of amplified and shifted by the latter to a suitable binary voltage.

46. Process according to claim 40, characterized by the fact that the output protective current is superposed on a digital line signal transmitted on the lines to be protected.

47. Process according to claim 41, characterized by the fact that the output protective current is superposed on a digital line signal transmitted on the lines to be protected.

48. Process according to claim 40, characterized by the fact that the output protective current is fed into a digital user terminal.

49. Process according to claim 41, characterized by the fact that the output protective current is fed into a digital user terminal.

50. Process according to claim 42, characterized by the fact that the output protective current is fed into a digital user terminal.

51. Process according to claim 43, wherein the digital user terminal is an ISDN user terminal.

52. Process according to claim 40, characterized by the fact that control of the voltage or voltages to be applied to the power supply unit is effected using software or via a hard-wired logic.

53. Process according to claim 41, characterized by the fact that control of the voltage or voltages to he applied to the power supply unit is effected using software or via a hard-wired logic.

54. Process according to claim 42, characterized by the fact that control of the voltage or voltages to be applied to the power supply unit is effected using software or via a hard-wired logic.

55. Process according to claim 43, characterized by the fact that control of the voltage or voltages to be applied to the power supply unit is effected using software or via a hard-wired logic.

56. Process according to claim 44, wherein the software used to control of the voltage or voltages to be applied to the power supply unit is in the microprocessor of a user terminal card.

57. Process according to one of claim 39 for providing protection against corrosion to metal lines which are closed on a side facing away from the power supply unit by at least one of an ohmic and an inductive load, or by a metal terminating unit (MT) of a network terminal unit (NT) of an ISDN network.

58. Process according to claim 39 for generating a current as a line detection signal.

* * * * *